United States Patent [19]

Rosenberg

[11] Patent Number: 4,640,825

[45] Date of Patent: Feb. 3, 1987

[54] PROCESS FOR SIMULTANEOUS REMOVAL OF $SO_2$ AND $NO_x$ FROM GAS STREAMS

[75] Inventor: Harvey S. Rosenberg, Columbus, Ohio

[73] Assignee: Battelle Memorial Institute, Columbus, Ohio

[21] Appl. No.: 716,290

[22] Filed: Mar. 26, 1985

[51] Int. Cl.$^4$ .................. C01B 21/00; C01B 17/00; C01B 21/38; C01B 17/74
[52] U.S. Cl. ............................ 423/235; 423/242; 423/390; 423/522
[58] Field of Search ............... 423/235, 235 D, 239, 423/239 A, 242 A, 242 R, 244 A, 244 R, 390, 522

[56] References Cited

U.S. PATENT DOCUMENTS

| 931,515 | 8/1909 | Sprague | 423/244 |
|---|---|---|---|
| 2,161,056 | 6/1939 | Johnstone | 423/242 |
| 2,737,445 | 3/1956 | Nosseu | 423/390 |
| 3,887,684 | 6/1975 | Griffith | 423/242 |
| 4,442,079 | 4/1984 | Donelly et al. | 423/235 |

FOREIGN PATENT DOCUMENTS

| 3317504 | 11/1984 | Fed. Rep. of Germany | 423/235 |
|---|---|---|---|
| 52-23569 | 2/1977 | Japan | 423/242 |

OTHER PUBLICATIONS

Graefe et al, "The Development of New and/or Improved Aqueous Processes for Removing $SO_2$ from Flue Gas", vol. 11, Envirogenics Report to AAPCA (1970).
Zinc Oxide-Based $SO_2$ Scrubbing System, Mitsui Mining & Smelting Co.
Kortun et al, "Reflexionsspektroskopische Untersuchungen im IR uber die Absorption von NO an Zinc Oxide, Berichte der Bunsen Gesellschaft, vol. 77, pp. 85–90 (1973).
Johnstone et al, "Recovery of Sulfur Dioxide from Waste Gases", Industrial and Engineering Chemistry, vol. 32, 1037–1049 (1940).
Lowell et al, Selection of Metal Oxides for Removing $SO_2$ from Flue Gas", Industrial Engineering Chemistry, vol. 10, 384–390 (1971).
Bienstock et al, "Bench Scale Investigation on Removing Sulfur Dioxide from Flue Gases", J. Air Pollution Control Ass., vol. 10, pp. 121–125 (1960).
DeBerry et al, "Rates of Reaction of $SO_2$ with Metal Oxides", Can. J. Chem. Eng., vol. 49, pp. 781–785 (1971).
Yuriva et al, "Catalytic Properties of Metal Oxides of Period IV of the Periodic System with Respect to Oxidation Reactions", Kinetika i Katalitz, vol. 6, pp. 1041–1045 (1965).
Alkhazov et al, "Catalytic Activity of Transition–Metal Oxides for the Reaction of Nitric Oxide with Carbon Monoxide", Kinetika i Katalitz, vol. 16, pp. 1230–1233 (1975).

*Primary Examiner*—Gregory A. Heller
*Attorney, Agent, or Firm*—Klaus H. Wiesmann

[57] ABSTRACT

A process for simultaneous removal of $SO_2$ and $NO_x$ from a gas stream that includes flowing the gas stream to a spray dryer and absorbing a portion of the $SO_2$ content of the gas stream and a portion of the $NO_x$ content of the gas stream with ZnO by contacting the gas stream with a spray of an aqueous ZnO slurry; controlling the gas outlet temperature of the spray dryer to within the range of about a 0° to 125° F. approach to the adiabatic saturation temperature; flowing the gas, unreacted ZnO and absorbed $SO_2$ and $NO_x$ from the spray dryer to a fabric filter and collecting any solids therein and absorbing a portion of the $SO_2$ remaining in the gas stream and a portion of the $NO_x$ remaining in the gas stream with ZnO; and controlling the ZnO content of the aqueous slurry so that sufficient unreacted ZnO is present in the solids collected in the fabric filter to react with $SO_2$ and $NO_x$ as the gas passes through the fabric filter whereby the overall feed ratio of ZnO to $SO_2$ plus $NO_x$ is about 1.0 to 4.0 moles of ZnO per of $SO_2$ and about 0.5 to 2.0 moles of ZnO per mole of $NO_x$. Particulates may be removed from the gas stream prior to treatment in the spray dryer. The process further allows regeneration of ZnO that has reacted to absorb $SO_2$ and $NO_x$ from the gas stream and acid recovery.

16 Claims, 4 Drawing Figures

PROCESS FOR SIMULTANEOUS REMOVAL OF $SO_2$ AND $NO_x$ FROM GAS STREAMS

STATEMENT OF GOVERNMENT INTEREST

This invention was made with the Government support under Contract No. DE-AC22-83PC60264 awarded by the Department of Energy. The Government has certain rights in this invention.

FIELD OF THE INVENTION

The invention includes a process for the simultaneous removal of $SO_2$ and $NO_x$ (NO and $NO_2$) from gas streams. ZnO is the material used for gas cleaning together with a spray dry scrubbing system.

BACKGROUND OF THE INVENTION

The use of ZnO for flue gas cleaning was presented as early as 1940 by Johnstone and Singh. Johnstone, H. F., and Singh, A. D., "Recovery of Sulfur Dioxide from Waste Gases—Regeneration of the Absorbent by Treatment with Zinc Oxide", Ind. Eng. Chem., 32 (8), 1037-1049 (1940). They proposed a type of regenerable double alkali process in which ZnO is reacted with sodium sulfite and bisulfite from an $SO_2$ absorber to precipitate zinc sulfite. The zinc sulfite is dried and then calcined to give pure $SO_2$ and ZnO, the latter being recycled.

Lowell, et al. performed a thermodynamic analysis on the oxides of 47 elements for use as sorbents for FGD in processes based upon thermal regeneration of the sorbent. Lowell, P. S., et al., "Selection of Metal Oxides for Removing $SO_2$ from Flue Gas", Ind Eng. Chem., Process Des. Develop, 10 (3), 384-380 (1971). Under flue gas conditions, thermodynamic analysis predicts that ZnO forms a sulfite in the presence of $SO_2$ at a temperature of 248° F. and below. Furthermore, the decomposition temperature for zinc sulfite is 374° F., which is lower than for the sulfite of any metal oxide except BeO and $Mn_2O_3$. However, zinc sulfite both disproportionates and decomposes to the oxide when heated in an inert atmosphere. The zinc sulfite disproportionates to sulfate and sulfide. Sulfate can also be formed as a result of sulfite oxidation by oxygen present in the flue gas. Zinc sulfate thermally decomposes to the oxide at 1364° F., but with intermediate formation of zinc oxysulfate at 1130° F. In a regenerable flue gas desulphurization process (FGD), it would be highly desirable to suppress the disproportionation and oxidation reactions in order to simplify the regeneration process.

Bienstock and Field studied the reaction between $SO_2$ and ZnO by passing simulated flue gas (without $NO_x$ or fly ash) through a fixed bed of ZnO at both 265° and 625° F. Bienstock, D., and Field, F. J., "Bench-Scale Investigation on Removing Sulfur Dioxide from Flue Gases", J. Air Pollut. Control Assoc., 10 (2), 121-125 (1960). In both cases, they found that the loading was less than 1 g $SO_2$/100 g ZnO when breakthrough of $SO_2$ occurred. This result is not surprising in view of the thermodynamic analysis which predicts a maximum temperature of 248° F. for zinc sulfite formation. However, DeBerry and Sladek studied the ZnO-$SO_2$ reaction in the range of 77° to 1472° F. by thermogravimetric analysis; the reaction rate was immeasurably small over the entire temperature range. DeBerry, D. W., and Sladek, K. J., "Rates of Reaction of $SO_2$ with Metal Oxides", Can. J. Chem. Eng., 49 (6), 781-785 (1971). The composition of their feed gas was 14.3 v/o $CO_2$, 3.4 v/o $O_2$, 2.0 v/o $H_2O$, 0.10 to 0.35 v/o $SO_2$, and balance $N_2$. Their $H_2O$ concentration was considerably lower than in actual flue gas.

Graefe, et al. studied the ZnO-$SO_2$ reaction at 131° F. with simulated flue gas saturated with $H_2O$ and obtained $SO_2$ loadings of about 30 g/100 g ZnO. Graefe, A. F., et al., "The Development of New and/or Improved Aqueous Processes for Removing $SO_2$ from Flue Gas", Vol. II, Envirogenics report to NAPCA, PB 196 781 (October, 1970). Their most interesting conclusions are that water vapor is required for absorption to occur, high humidities give higher absorptions, and a liquid water phase is not required. It was not stated how the reaction products were identified, but the main product was reported to be $ZnSO_3 \cdot 2\frac{1}{2}H_2O$. Some zinc sulfate was formed mainly because of the presence of $NO_2$. Graefe, et al. also found that zinc sulfite can be decomposed below 572° F. without disproportionation and without oxidation in the absence of air and preferably in the presence of steam. They found that zinc sulfate can be decomposed at 1832° F. Graefe, et al. proposed a ZnO fluidized bed system for the absorption and regeneration of $SO_2$, with separate thermal regenerators for sulfite and sulfate.

In Japan, Mitsui Mining and Smelting Company, Ltd., has developed a ZnO-based $SO_2$ scrubbing system that is in commercial use at their electrolytic zinc plants. An aqueous slurry of ZnO is fed to an absorption tower for reaction with $SO_2$ in tail gas from an acid plant to form zinc sulfite and bisulfite. A bleed stream from the tower is reacted with sulfuric acid to produce zinc sulfate and $SO_2$. The $SO_2$ gas is returned to the acid plant and the zinc sulfate solution is used at the ore roasting plant or for the production of zinc sulfate.

Several papers discuss the use of ZnO as a catalyst to reduce or decompose NO. Kortum and Knehr found that activated ZnO is capable of reducing NO at room temperature to $N_2O$. Kortum, V. G., and Knehr, H., Reflexionsspektroskopische Untersuchungen im IR uber die Adsorption von NO an Zinkoxid", Berichte der BunsenGesellschaft, 77 (2), 85-90 (1973). Yur'eva, et al. found that ZnO catalytically decomposes NO in the range of 1200° to 1380° F. Yur'eva, J. M., et al., "Catalytic Properties of Metal Oxides of Period IV of the Periodic System with Respect to Oxidation Reactions - II. Decomposition of Nitric Oxide", translated from Kinetika i Kataliz, 6 (6), 1041-1045 (1965). Alkhazov, et al. found that ZnO can act as a catalyst for the reduction of NO by CO in the range of 210° to 930° F. Alkhazov, F. G., et al., "Catalytic Activity of Transition-Metal Oxides for the Reaction of Nitric Oxide with Carbon Monoxide", translated from Kinetika i Kataliz, 16(5), 1230-1233 (1975).

Although a conceptualized flue gas desulphurization process using ZnO has been described in the literature by Graefe et al., it is not the optimum process. A fluidized bed reactor would not be the best contacting device for flue gas subsaturated with water. In addition, there is a complete lack of data on the reaction between ZnO and $SO_2$ from flue gas in the temperature range of most interest (150° to 250° F.). Operation in this temperature range corresponds to flue gas subsaturated with water and would allow the use of contacting devices such as a spray dryer and/or a fabric filter or a partial gas quench followed by a bed filter. Also, it would be possible to eliminate the need for a separate sulfate regenerator as described later.

Previous work on the use of ZnO for combined $SO_2/NO_x$ removal from flue gas could not be found in the literature, but the possibility was alluded to by Graefe, et al. Data on the reaction between ZnO and $NO_x$ from flue gas could not be found for any temperature range.

Currently, the leading flue gas desulfurization process in terms of installed utility capacity is wet limestone scrubbing. The process employs a limestone slurry to contact the flue gas and react with the $SO_2$ to produce a calcium sulfite/sulfate sludge for waste disposal. In addition to the waste disposal requirements, process reliability is still a problem area. Plugging and scaling in the system cause a high amount of maintenance work and corrosion can be severe. It is still difficult to select an adequate material to withstand the conditions in the outlet duct and stack. The maintenance and materials problems can add significantly to the process costs. Also, the process does not have any $NO_x$ removal capability, and with high-sulfur coal, it is difficult to achieve the 90 percent $SO_2$ removal required by the New Source Performance Standards. Alternatives for increasing the $SO_2$ removal include the use of additives to enhance the limestone reactivity, or the use of slaked lime which is more reactive than limestone. These alternatives add to the process cost.

The need for FGD processes that are more reliable, environmentally acceptable, and less costly has led to the development of the spray dry scrubbing process. Spray nozzles or centrifugal atomizers in a spray dryer create a mist of fine droplets of slaked lime slurry (limestone does not possess sufficient reactivity) into which the $SO_2$ is absorbed as the flue gas mixes intimately with the spray. Water in the droplets is evaporated by the sensible heat in the flue gas, so that the calcium sulfite and sulfate reaction products leave the scrubber as a dry powder entrained in the flue gas. The reaction products are collected along with the fly ash in a fabric filter or electrostatic precipitator following the spray dryer. The quantity of water fed to the spray dryer is regulated so that evaporation does not cool the flue gas closer than about 20° F. to its adiabatic saturation temperature (typically about 125° F.). Because the gas remains unsaturated and the slurry pumping requirements are greatly reduced (all of the water is evaporated rather than being recycled), many of the operating problems associated with wet scrubbers are avoided.

However, there is still a dry waste product for disposal and lime, rather than less expensive limestone, must be used as the sorbent. Also, it is difficult to achieve 90 percent $SO_2$ removal with high-sulfur coal unless the lime feed rate is increased to the point where the cost may become prohibitive. The $NO_x$ removal is nil; in fact there is considerable evidence that a visible plume is produced at certain temperatures because NO is oxidized to $NO_2$ as it passes through the solids layer in a fabric filter. The process can be modified to achieve 50 to 70 percent $NO_x$ removal by using sodium hydroxide as an additive and operating at a spray dryer outlet temperature of 200° F. (75° F. above saturation). However, sodium hydroxide is expensive and the waste product contains soluble salts that can cause surface and groundwater contamination.

Thus far, $NO_x$ emissions from stationary sources have not received as much attention as $SO_2$ emissions. It is possible to meet the current EPA regulations for $NO_x$ emissions through combustion modifications. However, $NO_x$ control will probably receive increased attention in the future. $NO_x$ emissions are believed to have a deleterious effect on human health and visibility and are believed to be significant contributors to the formation of both nitrate and sulfate acid precipitation. Furthermore, the total annual $NO_x$ emission from stationary sources has been steadily increasing, while $SO_2$ and particulate emissions have been leveling off or decreasing.

The most advanced technology for $NO_x$ removal from flue gas is selective catalytic reduction (SCR) with ammonia. This process operates at 700° F. and, therefore, is difficult to retrofit. In Japan, flue gas cleaning on a coal-fired boiler includes an SCR system for $NO_x$ removal, an electrostatic precipitator for fly ash removal, and a wet limestone FGD system for $SO_2$ removal. Since the combined cost of the separate processes for $SO_2$ and $NO_x$ control is relatively high, there is incentive for the development of a process for the simultaneous removal of $SO_2$ and $NO_x$. If such a process were regenerable, i.e., did not produce a waste product for disposal, it would be even more attractive.

Several other processes for the simultaneous removal of $SO_2$ and $NO_x$ from flue gas have been proposed and tested, but none of them have achieved commercial significance. These processes include the use of activated carbon, copper oxide, or sodium aluminate as dry sorbents, the use of electron beam radiation in conjunction with spray dry scrubbing, and the use of iron sulfide (pyrites) in a wet scrubber. Each of these processes has disadvantages that are absent from the ZnO process. The activated carbon process requires ammonia for $NO_x$ removal, involves the circulation of a large inventory of solids, and requires thermal regeneration at high temperature. The copper oxide process also requires ammonia for $NO_x$ removal and a reducing gas such as hydrogen for conversion of copper sulfate to copper and $SO_2$; it is not suitable for retrofit because the operating temperature is about 700° F. as compared with a 300° F. flue gas exit temperature from the boiler train. The sodium aluminate process requires a reducing gas for regeneration and a gas-solid contacting device that would have a relatively high pressure drop. The electron beam process requires a source of high energy electrons and uses either ammonia, which is converted to fertilizer, or lime, which produces solid waste, including water-soluble calcium nitrate. The chemistry of wet scrubbing with pyrites is extremely complex and the process requires thermal regeneration at high temperature.

In contrast, the ZnO process requires no raw materials other than makeup ZnO, produces no waste product, uses conventional equipment currently in operation on utility FGD systems, and requires moderate temperatures for thermal regeneration. For these reasons, the ZnO process should cost substantially less than the other simultaneous removal processes. The cost of the ZnO process is best compared with the combined cost of SCR and wet limestone FGD for application on high-sulfur coal-fired boilers. However, it must be remembered that the latter more conventional scheme produces solid waste for disposal; hence, power plants in urban locations may not be able to utilize a non-regenerable FGD process, or will have to incur substantial costs over those estimated for disposal.

The current invention describes a regenerable process for the simultaneous removal of $SO_2$ and $NO_x$ from waste gas streams. Further, the range of conditions for the efficient simultaneous removal of these compounds has been discovered that makes the process amenable to widespread use.

BRIEF DESCRIPTION OF THE INVENTION

The current invention utilizes ZnO for gas cleaning and offers the advantages of spray dry scrubbing without the disadvantages mentioned previously. The process can remove greater than 90 percent of the $SO_2$ and up to 90 percent of the $NO_x$ from waste gas streams. There is no waste product because the spent sorbent is thermally regenerated, producing a concentrated stream of $SO_2$ and $NO_x$ for further processing into useful byproducts. The regeneration temperature is considerably lower than that required in other regenerable FGD processes so that the energy consumption is less.

DETAILED DESCRIPTION OF THE INVENTION AND PREFERRED EMBODIMENT

Figure 1:
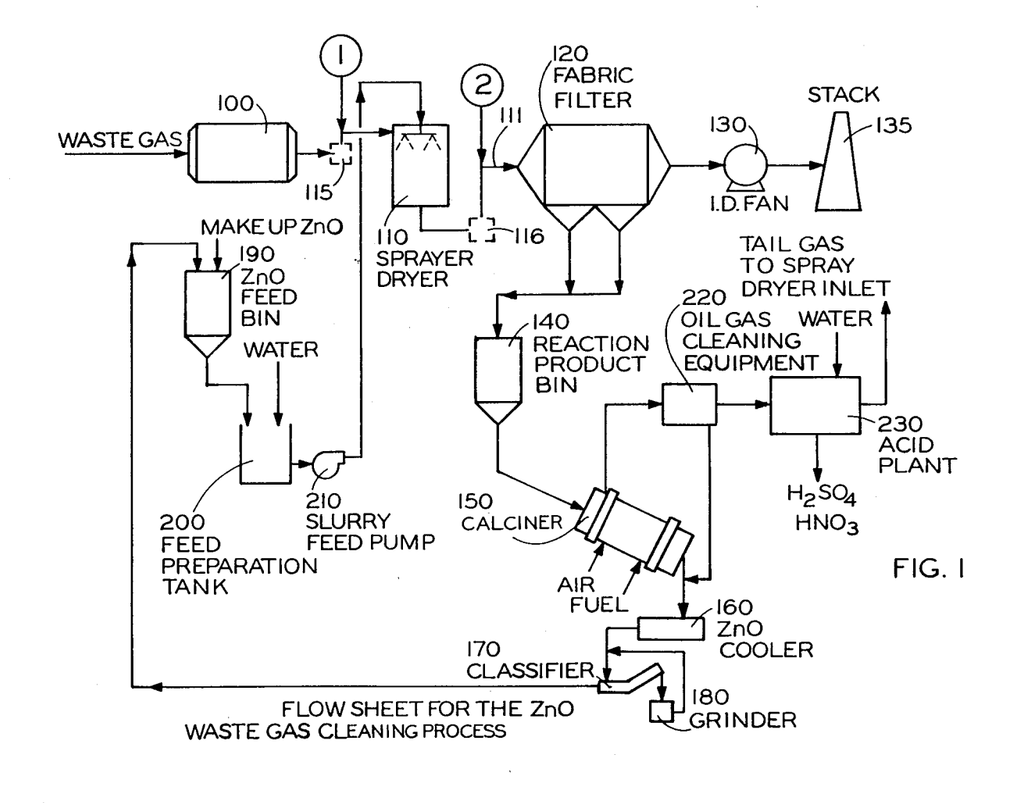
FIG. 1 depicts a flow sheet for the ZnO process of the present invention.

A flow sheet for the ZnO process of the current invention is shown in FIG. 1. As with any regenerable process, prior particulate collection is required to prevent the former from entering the regeneration loop and contaminating the byproducts. The type of particulate collection device 100 used depends upon the amount of particulates that can be conveniently separated by downstream processing. An electrostatic precipitator provides a high particulate removal efficiency, but it may be possible to use a less expensive device and tolerate a lower removal efficiency as described later. Waste gas from the particulate collection device 100, typically at a temperature of 250° to 500° F. depending upon the source of the gas and the type of pretreatment (quenching or heat exchange may be required for a hot gas) enters a spray dryer 110 where it is contacted with a slurry of ZnO that has been atomized to fine droplets using dual fluid nozzles or centrifugal atomizers. The spray dryer outlet temperature is controlled in the range of 125° to 250° F., and preferably 150° to 200° F., to optimize the removal of both $SO_2$ and $NO_x$ in the spray dryer and in a downstream fabric filter 120. The difference between the spray dryer outlet temperature and the adiabatic saturation temperature of the gas stream is termed the approach to saturation. The adiabatic saturation temperature of a gas stream is determined by its initial temperature and moisture content. In the case described, the approach to saturation is in the range of about 0° to 125° F., and preferably about 25° to 75° F.

The outlet temperature of the spray dryer 110 is controlled by the amount of water in the feed slurry, and the $SO_2$ and $NO_x$ removal efficiencies are controlled by the amount of ZnO in the feed slurry. The amount of ZnO fed to the spray dryer 110 is such that sufficient unreacted ZnO is present in the solids collected in the fabric filter 120 to react with $SO_2$ and $NO_x$ as the flue gas passes through the filter cake. The overall stoichiometric ratio of ZnO to $SO_2$ plus $NO_x$, as specified by the following chemical reactions is in the range of 1.0 to 4.0, and preferably 1.2 to 2.0:

$$SO_2 + ZnO \rightarrow ZnSO_3 \tag{1}$$

$$SO_2 + \tfrac{1}{2}O_2 + ZnO \rightarrow ZnSO_4 \tag{2}$$

$$2NO + 3/2 O_2 + ZnO \rightarrow Zn(NO_3)_2 \tag{3}$$

$$2NO_2 + \tfrac{1}{2}O_2 + ZnO \rightarrow Zn(NO_3)_2 \tag{4}$$

Some of the $ZnSO_3$ and $ZnSO_4$ reaction products may be present as hydrates. The above reactions are simplified in that there is a synergistic effect in removal efficiency of both $SO_2$ and $NO_x$ when both species are present, although individual compounds containing both sulfur and nitrogen have not been found. Also, it is possible that some of the NO and $NO_2$ are decomposed to elemental nitrogen and oxygen as the gas stream flows through the system. It has been shown that ZnO is far more effective for $NO_x$ removal than are the reaction products of ZnO and $SO_2$. Although $SO_2$ and $NO_x$ removal occur in both the spray dryer 110 and the fabric filter 120, $SO_2$ removal predominates in the former and $NO_x$ in the latter. However it is important that not all of the $SO_2$ be removed in the spray dryer 110 in order to take advantage of the synergistic effect of $SO_2$ on $NO_x$ removal in the fabric filter 120.

A general description of the process without particulate removal or regeneration would be flowing the gas stream to a spray dryer and absorbing a portion of the $SO_2$ content of the gas stream and a portion of the $NO_x$ content of the gas stream with ZnO by contacting the gas stream with a spray of an aqueous ZnO slurry; controlling the gas outlet temperature of the spray dryer to within the range of a 0° to 125° F. approach to the adiabatic saturation temperature; flowing the gas, unreacted ZnO and ZnO with absorbed $SO_2$ and $NO_x$ from the spray dryer to a fabric filter and collecting any solids therein and absorbing a portion of the $SO_2$ remaining in the gas stream and a portion of the $NO_x$ remaining in the gas stream with ZnO; and controlling the ZnO content of the aqueous slurry so that sufficient unreacted ZnO is present in the solids collected in the fabric filter to react with $SO_2$ and $NO_x$ as the gas passes through the fabric filter whereby the feed ratio of ZnO to $SO_2$ plus $NO_x$ is about 1.0 to 4.0 moles of ZnO per mole of $SO_2$ and about 0.5 to 2.0 moles of ZnO per mole of $NO_x$.

In the alternative the feed ratio using one to four times the stoichiometric ratio of reactions (1) through (4) above could also be used.

The gas stream from the fabric filter passes into an induced draft fan 130 to overcome the pressure losses of the spray dryer 110, the fabric filter 120, and the associated ductwork. From the fan 130, the gas stream is exhausted via the stack 135.

The solids collected in the fabric filter 120 are stored for regeneration in a reaction product bin 140. It may be possible to separate residual particulates from ZnO and its reaction products by a dry screening or air classifying technique. If so, the upstream particulate removal requirements would be less stringent so that less expensive multicyclones could be used instead of an electrostatic precipitator for the particulate device 100.

The spent solids are fed to a static, rotary, or fluidized bed calciner 150 for thermal regeneration. The regeneration temperature is dependent upon the amount of sulfate formed in the absorption step. The sulfite and nitrate can be decomposed at temperatures in the range of 450° to 550° F. according to the reverse of Reactions 1, 3, and 4. However, the sulfate decomposes at about 1400° F. according to the reverse of Reaction 2. Several alternatives to operating the calciner 150° at 1400° F. are available depending upon the percent of the sulfite that is oxidized to sulfate. If the level of oxidation is low, the sulfate can be allowed to reach a steady-state concentration in the recycled solids. This will occur because some zinc compounds will be lost from the system on each recycle and will have to be made up by adding fresh ZnO. Another alternative is to add coke to the calciner to lower the decomposition temperature of sulfate according to the following reaction:

$$ZnSO_4 + \tfrac{1}{2}C \rightarrow ZnO + SO_2 + \tfrac{1}{2}CO_2. \quad (5)$$

A third alternative is to extract the sulfate with water prior to calcination; zinc sulfate is highly soluble while the oxide and sulfite are relatively insoluble. This alternative may not be economically attractive because of the added cost of drying the zinc compounds after the extraction step and the need for disposing of the separated zinc sulfate.

The regenerated ZnO is cooled in a cooler 160 and classified and ground as needed by classifier 170 and grinder 180. It is stored for reuse in a feed bin 190. Regenerated ZnO and makeup ZnO are slurried in water in a feed preparation tank 200 and fed to the spray dryer 110 through a feed pump 210. The ZnO concentration in the slurry is determined by the desired mole ratio of ZnO to $SO_2$ plus $NO_x$ in the flue gas and the spray dryer outlet temperature. The ZnO particle size is determined by the surface area required for high removal efficiency of $SO_2$ and $NO_x$. The surface area should be in the range of 1 to 30 $m^2/g$, preferably 5 to 20 $m^2/g$. The classifier 170 and grinder 180 are provided at the exit of the regenerated ZnO cooler to handle any particle agglomeration that may occur during the calcination step. However, if the calcination is carried out in the range of 450° to 550° F., agglomeration is not expected to occur.

The off gas from the calciner 150, which contains a high concentration of $SO_2$ and $NO_x$, is fed to conventional gas cleaning equipment 220 for removal of particulates and trace impurities. The type of equipment used depends upon the degree of cleaning required. The ZnO particulate carryover from the calciner 150 may be less for a rotary type than a fluidized bed type. The particulates can be removed in an electrostatic precipitator or a fabric filter. If necessary this equipment can be preceded with a cyclone followed by a waste heat boiler depending upon the calcination temperature. The recovered ZnO is sent to the ZnO cooler 160 for eventual recycle to the spray dryer 110.

The clean gas, containing a high concentration of $SO_2$ and $NO_x$, is fed to an acid plant 230 which uses a modified contact or chamber process to produce sulfuric and nitric acids. In the contact process, the gas is fed to catalytic converters to oxidize the $SO_2$ to $SO_3$. The $SO_3$ is absorbed by sulfuric acid to produce more acid. In this case, the $NO_x$ will also be absorbed by the sulfuric acid and must be removed by thermal stripping. The separated $NO_x$ is then fed to an absorption tower for conversion to nitric acid. The tail gas streams from the catalytic converter and the absorption tower are fed to the spray dryer inlet for removal of residual $SO_2$ and $NO_x$, respectively.

In the chamber process, $NO_x$ is recovered for reuse, but in this case, the $NO_x$ that is continuously supplied by absorption from the flue gas is converted to nitric acid, while excess $NO_x$ that is required for $SO_2$ oxidation is recycled. The recovered sulfuric and nitric acids are sold for industrial use.

The invention finds utility in coal or oil fired electric power generating plants, in coal or oil fired boilers for steam production, in waste incineration, in smelters, in the steel industry and in metal finishing.

Process Variations

Figure 2:
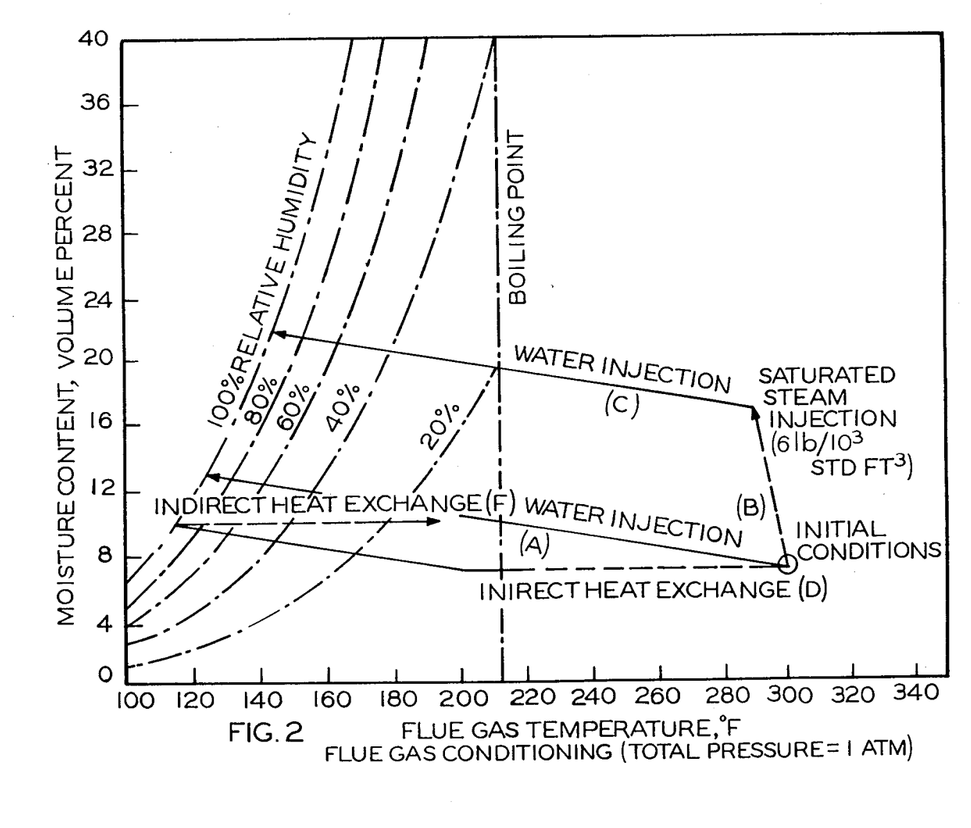
FIG. 2 is a graph depicting flue gas conditions at a total pressure of 1 atmosphere; moisture content is plotted versus flue gas temperature and several curves of constant relative humidity are shown.

In an aqueous cleaning process, the gas temperature and moisture content are not completely independent variables because they are related by the type of gas conditioning used prior to or during the process. At a coal-fired boiler, for example, flue gas leaves the air preheater at a temperature of about 300° F. and a moisture content of about 7 volume percent. These would be the initial conditions for an add-on gas cleaning process with or without prior fly ash collection in a particulate collection device 100. The gas stream can be changed from the initial conditions by water injection, steam injection, and/or indirect heat exchange as discussed below. Heat balance calculations were performed for the case of a coal-fired boiler to outline the relationship between moisture content and gas temperature for the various types of gas conditioning. The results of these calculations are illustrated in FIG. 2 for the initial conditions of 7 volume percent water vapor and 300° F. The principles would be the same for gas with different initial conditions, such as from a waste incinerator.

Water injection at the initial conditions (Line A in FIG. 2) corresponds to the use of the spray dryer 110 absorber. A quencher or humidifier (not illustrated) could precede the spray dryer 110 or replace the spray dryer 110 as discussed below. The spray dryer 110 is usually not operated to saturation because the objective is to obtain a dry product. If saturated steam injection (Line B) is used prior to the spray dryer 110 (Line C), the moisture content of the gas stream can be increased at any given temperature. If heat is extracted from the gas stream by indirect heat exchange (Line D) prior to the spray dryer 110 (Line E), the gas stream can be saturated and then reheated to subsaturated conditions with the previously extracted heat (Line F) between the spray dryer 110 and the fabric filter 120.

The point is that the techniques described above can be used to optimize $SO_2$ and $NO_x$ removal with ZnO in the spray dryer 110 and the fabric filter 120. Steam injection allows the spray dryer 110 and/or fabric filter 120 (depending upon the point of injection, point 1 or 2 of FIG. 1) to operate at a higher moisture content for a given gas temperature. A higher gas temperature (up to about 200° F.) enhances $NO_x$ removal, but a high moisture content is required for good $SO_2$ removal. Another alternative is to operate the spray dryer 110 at or near the adiabatic saturation temperature to maximize $SO_2$ removal in the spray dryer 110, and reheat the gas between the spray dryer 110 and the fabric filter 120 (with the regenerative technique described above, with steam coils in line 111, point 2 of FIG. 1, or with hot air injection at point 2 of FIG. 1) to maximize $NO_x$ removal in the fabric filter 120. It is important that sufficient unreacted ZnO and SO$_2$ leaves the spray dryer 110 and enters the fabric filter 120 for reaction with NO$_x$.

Both SO$_2$ and NO$_x$ removal can be enhanced by the use of additives to the ZnO in the feed preparation tank 200. One class of additives, of which sodium hydroxide is an example, would increase the reactivity of ZnO by conversion to Zn(OH)$_2$. Also, the presence of sodium would enhance the synergistic effect of SO$_2$ on NO$_x$ removal through the formation of sodium sulfite which can react with NO$_x$ to form imidodisulfonates or sulfamates. The weight ratio of NaOH to ZnO should be about 1:10, but can be as high as 1:1, especially if the NaOH can be regenerated along with ZnO (by heating and reaction with water).

Another class of additives, of which high surface area silica (silica gel) is an example, would enchance SO$_2$ and NO$_x$ removal in the fabric filter 120 by absorbing water on a filter cake that forms in the fabric filter 120. The absorbed water enhances the reactions among ZnO, SO$_2$, and NO$_x$ as the gas passes through the filter cake. The silica gel should have a surface area in the range of 200 to 800 m$^2$/g, and the weight ratio of silica gel to ZnO should be in the range of 1:10 to 1:1. The silica gel would be thermally regenerated (removal of the absorbed water) prior to or simultaneously with the ZnO.

The $NO_x$ removal can be enhanced by oxidizing NO to the more reactive $NO_2$. This can be done by ozone injection into the gas stream or, more preferably, by oxidation with oxygen already present in the gas. The oxidation with oxygen is favored by low temperature and long residence time. An oxidation chamber 115 or 116 can be used before or after the spray dryer 110; the downstream location has the advantage of lower temperature. A catalyst can be used to greatly reduce the required residence time. The catalyst would have to be designed to handle the particulate loading in the gas stream (parallel passage design). It is advantageous to use a catalyst upstream of the spray dryer 110 because the particulate loading would be lower than downstream where ZnO and its reaction products are present in the gas stream. However, it may also be possible to use a parallel passage type of catalyst downstream from the spray dryer 110. In any event, the $NO_2$ would be removed by reaction with ZnO as the gas passes through the filter cake in the fabric filter 120. If the oxidation occurs upstream of the spray dryer 110, a portion of the $NO_2$ will be removed by reaction with ZnO in the spray dryer 110.

Another technique for increasing $NO_x$ removal is to minimize $SO_2$ removal in the spray dryer 110 so that the $SO_2$ can exert a synergistic effect on $NO_x$ removal in the fabric filter 120. This can be achieved by feeding finer droplets (less than 50 microns) to the spray dryer 110 so that the water in the ZnO slurry will evaporate faster, operating the spray dryer 110 at an outlet temperature above 150° F., and/or injecting part of the ZnO as a dry powder into the fabric filter 120 to precoat the bags after each cleaning cycle and/or into the gas stream line 111 between the spray dryer 110 and the fabric filter 120. If all of the ZnO is injected as a dry powder, the spray dryer 110 can be replaced by a quencher to condition the gas stream to the appropriate temperature and humidity prior to the fabric filter 120.

Other process variations include the use of a quencher followed by a parallel passage, moving bed, fixed bed, or fluidized bed reactor rather than a fabric filter 120. A parallel passage reactor utilizes wire screens to hold the ZnO reactant in thin envelopes. The gas passes through spaces between the envelopes and the $SO_2$ and $NO_x$ react with the ZnO. Regeneration would occur by passing a hot combustion gas through the reactor. The advantage of this configuration is a lower pressure drop than a conventional packed or fixed bed. A moving bed reactor offers the advantage of a continuous process; i.e., gas flow to the reactor does not have to be interrupted for the regeneration cycle. A fluidized bed also can be operated continuously but the gas entering the bed must be significantly above the adiabatic saturation temperature. However, a fluidized bed has the disadvantage of requiring a downstream particulate collection device, and generally a higher pressure drop than the other gas-solid contractors mentioned above.

EXPERIMENTAL RESULTS

The reactions between ZnO and $SO_2/NO_x$ were studied in a fixed-bed reactor for application to spray dry scrubbing.

The experimental conditions used to study the ZnO process are outlined below:

Gas Composition (Dry Basis)
- $CO_2$ 12.00 vol. percent
- $O_2$ 5.25 vol. percent
- $SO_2$ 3,000 ppmv
- NO 700 ppmv
- $NO_2$ 70 ppmv
- $N_2$ 82.37 vol. percent Moisture Content of Gas
- Selected based on operating temperature (125° to 200° F.) and
- Line A in FIG. 2.

Gas Flow Rate
- Volumetric 1,200 $cm^3$/min
- Superficial velocity 2 ft/min

Characteristics of ZnO
- Type AZO-77S
- Surface area 8.00 $m^2/g$
- Weight used in bed 5.00 g Characteristics of Diluent
- Type American Foundry Sand No. 61; Glass beads
- Particle size 250 microns; 800 microns
- Weight used in bed 100 g or 0 g The removal efficiencies obtained for $SO_2$ and $NO_x$ at 135°, 150°, and 200° F. are shown in Table 1 for a diluted bed of ZnO. The results indicate that greater than 90 percent $SO_2$ removal should be attainable under conditions corresponding to spray cooling of the flue gas to a temperature between 135° and 150° F., or a 12° to 27° F. approach to the adiabatic saturation temperature. This represents a practicable operating condition for the spray dryer 110 and the fabric filter 120. However, the $NO_x$ removal efficiencies obtained in the fixed bed under these conditions were low.

The use of a diluted bed of ZnO to prevent channeling probably results in the rapid formation of a layer of zinc sulfite reaction product on each particle of ZnO. The lack of available ZnO surface area may hinder the absorption of $NO_x$. Accordingly, three experiments were performed with undiluted beds of ZnO at a temperature of 190° F. and 18 percent relative humidity corresponding to a point on Curve A of FIG. 2. One bed consisted of 5.0 g of fresh ZnO, one bed consisted of 5.0 g of ZnO previously exposed to simulated flue gas at 150° F. and 55 percent relative humidity also corresponding to a point on Curve A of FIG. 2 for 6.5 hours, and one bed consisted of 2.5 g ZnO previously exposed to simulated flue gas under the same conditions plus 2.5 g of fresh ZnO. The $SO_2$ and $NO_x$ removal results are summarized in Table 2. Not surprisingly, the $SO_2$ removal efficiency increases with the amount of fresh ZnO in the bed. However, the $NO_x$ removal efficiency also increases with the amount of fresh ZnO in the bed. These results are a strong indication that ZnO is a more effective reactant for $NO_x$ than is zinc sulfite. The results also indicate that the reaction products between ZnO and $SO_2$ do not enhance $NO_x$ removal.

Two duplex experiments were performed in an attempt to simulate the dry portion of a spray dryer 110 plus a fabric filter 120. The experiments were performed at 190° F. and 18 percent relative humidity. In the first portion of each experiment, the packed bed consisted of 5.0 g of ZnO diluted with 0.8 mm diameter glass beads at a weight ratio of 20/1. After exposure to simulated flue gas for about 7 hours, the "used" ZnO was separated from the glass beads and put back into the reactor. The undiluted "used" ZnO was then re-exposed to flue gas with the $SO_2$ concentration adjusted to account for prior removal. In one experiment, 5.0 g of fresh ZnO was added to the "used" ZnO to simulate a stoichiometric ratio greater than one in the spray dryer. The $SO_2$ and $NO_x$ removal results are summarized in Table 3. In the experiment with the fresh ZnO added after separation from the glass beads, the maximum overall removal efficiencies were 93 percent for $SO_2$ and 58 percent for $NO_x$. It should be possible to achieve higher $NO_x$ removal in an actual spray dryer 110 and fabric filter 120 because the ZnO would be in a continuous flow system. Further, the process parameters could be manipulated to adjust the $SO_2$ removal in the spray dryer 110 so as to optimize the overall $NO_x$ and $SO_2$ removal efficiencies.

Figure 3:
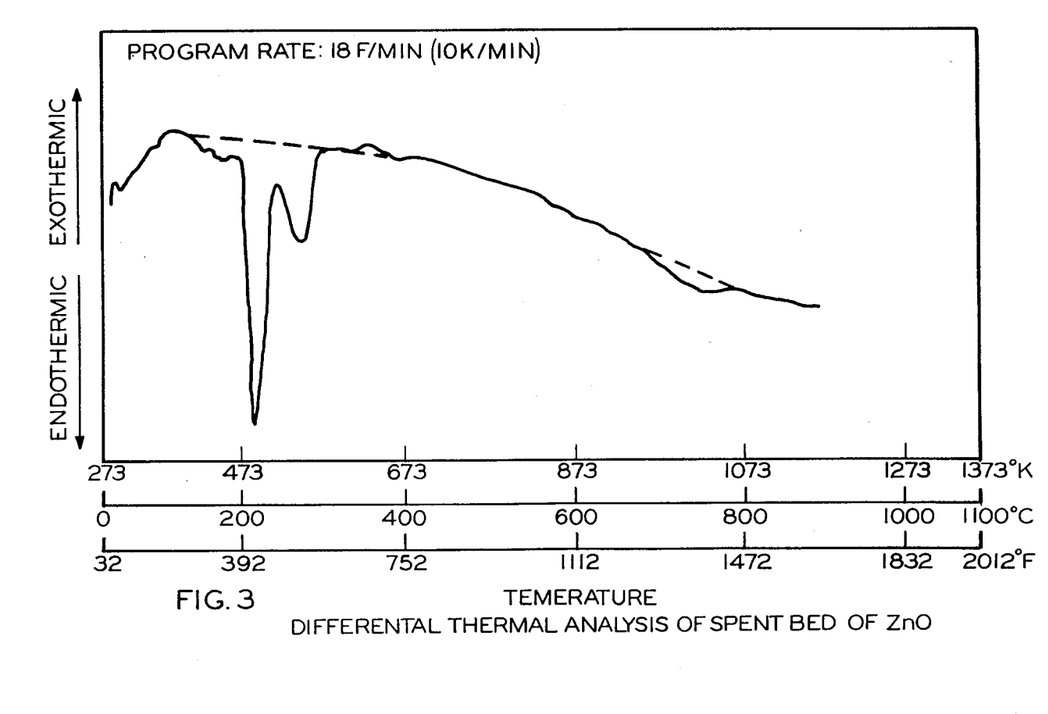
FIG. 3 depicts the results of a differential thermal analysis of a spent bed of ZnO.

A sample of a spent bed of undiluted ZnO was subjected to differential thermal analysis (DTA) and the results are shown in FIG. 3. There are three distinct peaks at 426°, 531°, and 1393° F., respectively. It is postulated that the lower temperature peaks represent $SO_2$ and $NO_x$ from the decomposition of sulfite and nitrite or nitrate. The high temperature peak most likely represents $SO_2$ from the decomposition of sulfate, as the decomposition temperature of $ZnSO_4$ is about 1418° F.

Figure 4:
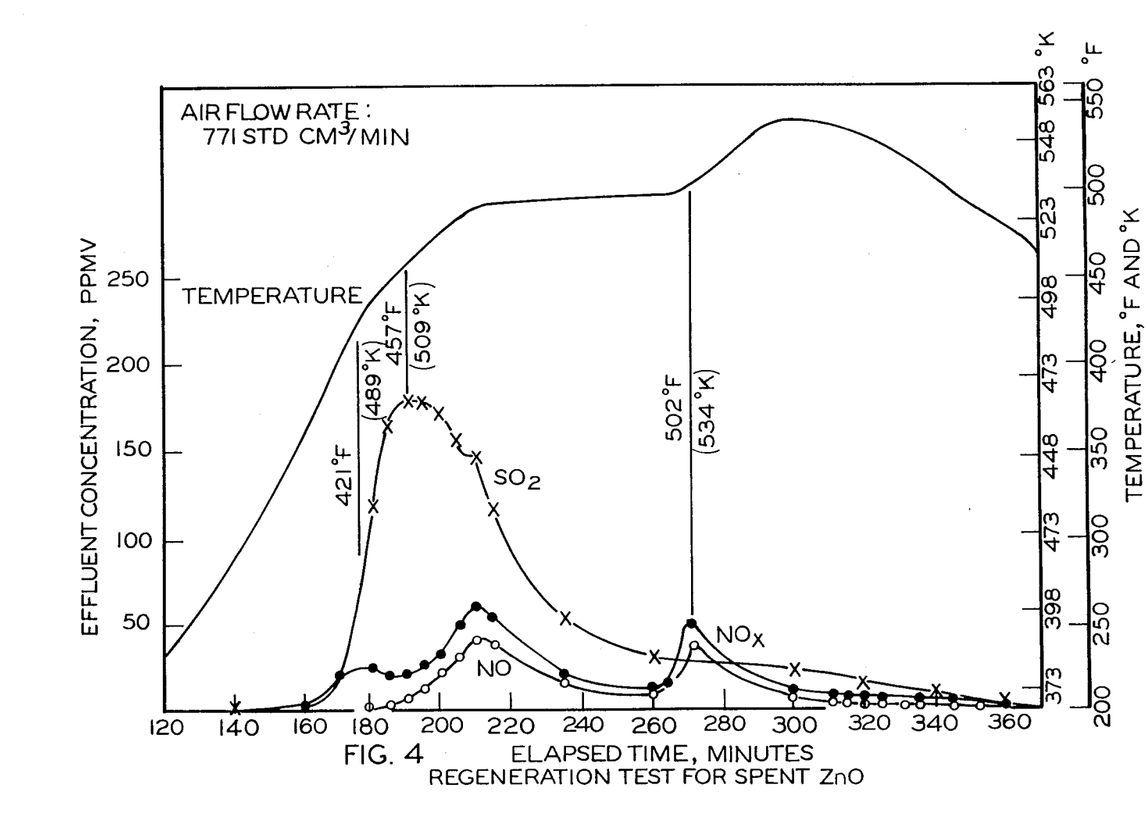
FIG. 4 depicts the results of a regeneration test for ZnO.

A bed of spent ZnO was subjected to a regeneration test by differential thermal heating in the absorption reactor while being purged with air. The off gas was continuously monitored for $SO_2$ and $NO_x$ and the results are shown in FIG. 4. Evolution of $SO_2$ and $NO_x$ began a little above 400° F. These results are in substantial agreement with the DTA data and confirm the regenerable nature of the process.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

TABLE 1

| $SO_2$ AND $NO_x$ REMOVAL WITH DILUTED ZnO[a] | | | |
|---|---|---|---|
| Temperature, F. | Relative Humidity, percent | Maximum $SO_2$ Removal, percent | Maximum $NO_x$ Removal, percent |
| 135 | 70 | 100 | 20 |
| 150 | 50 | 71 | 7.0 |
| 200 | 12 | 7.5 | 13 |

[a]ZnO: 5.00 g; foundry sand: 100 g.

TABLE 2

| $SO_2$ AND $NO_x$ REMOVAL WITH UNDILUTED ZnO[a] | | |
|---|---|---|
| Type of Packed Bed | Maximum $SO_2$ Removal, percent | Maximum $NO_x$ Removal, percent |
| Fresh ZnO, 5.0 g | 65 | 45 |
| "Used" ZnO, 5.0 g[b] | 20 | 25 |
| "Used" ZnO, 2.5 g[b] plus fresh ZnO, 2.5 g | 50[c] | 40 |

[a]Temperature: 190 F.; relative humidity: 18 percent.
[b]Exposed to simulated flue gas at 150 F. and 55 percent relative humidity for 6.5 hours.
[c]$SO_2$ deleted from flue gas prior to achieving maximum removal.

TABLE 3

| $SO_2$ AND $NO_x$ REMOVAL IN DUPLEX EXPERIMENTS[a] | | | | | | | |
|---|---|---|---|---|---|---|---|
| Diluted Bed Composition,[b] Bed A | Undiluted Bed Composition,[c] Bed B | Maximum $SO_2$ Removal in Bed A, percent | Maximum $NO_x$ Removal in Bed A, percent | Maximum $SO_2$ Removal in Bed B, percent | Maximum $NO_x$ Removal in Bed B, percent | Maximum Overall $SO_2$ Removal, percent | Maximum Overall $NO_x$ Removal, percent |
| Glass beads, 100 g ZnO, 5 g | Bed A, 2.5 g | 55 | 30 | 35 | 15[d] | 71 | 41 |
| Glass beads, 100 g ZnO, 5 g | Bed A, 3.4 g ZnO, 5 g | 55 | 30 | 85 | 40[e] | 93 | 58 |

[a]Temperature: 190 F.; relative humidity: 18 percent: superficial gas velocity: 2 ft/min.
[b]Exposure time of about 7 hours.
[c]Separated from 0.8 mm glass beads.
[d]$SO_2$ concentration reduced to 800 ppmv.
[e]$SO_2$ concentration reduced to 1,300 ppmv.

I claim:
1. A process for simultaneous removal of $SO_2$ and $NO_x$ from a gas stream comprising:
 a. flowing the gas stream to a spray dryer and absorbing a portion of the $SO_2$ content of the gas stream and a portion of the $NO_x$ content of the gas stream with ZnO by contacting the gas stream with a spray of an aqueous ZnO slurry;
 b. controlling the gas outlet temperature of the spray dryer to within the range of a 0° to 125° F. approach to the adiabatic saturation temperature;
 c. flowing the gas, unreacted ZnO and ZnO with absorbed $SO_2$ and $NO_x$ from the spray dryer to a fabric filter and collecting any solids therein and absorbing a portion of the $SO_2$ remaining in the gas stream and a portion of the $NO_x$ remaining in the gas stream with ZnO; and
 d. controlling the ZnO content of the aqueous slurry so that sufficient unreacted ZnO is present in the solids collected in the fabric filter to react with $SO_2$ and $NO_x$ as the gas passes through the fabric filter whereby the overall feed ratio of ZnO to $SO_2$ plus $NO_x$ is about 1.0 to 4.0 moles of ZnO per mole of $SO_2$ and about 0.5 to 2.0 moles of ZnO per mole of $NO_x$.

2. The process of claim 1 further comprising removing particulates from the gas stream prior to flowing the gas stream to the spray dryer.

3. A process for simultaneous removal of $SO_2$ and $NO_x$ from a gas stream comprising:
   a. removing particulates from the gas stream;
   b. flowing the gas stream to a spray dryer and absorbing a portion of the $SO_2$ content of the gas stream and a portion of the $NO_x$ content of the gas stream with ZnO by contacting the gas stream with a spray of an aqueous ZnO slurry;
   c. controlling the gas outlet temperature of the spray dryer to within the range of a 0° to 125° F. approach to the adiabatic saturation temperature;
   d. flowing the gas, unreacted ZnO and ZnO with absorbed $SO_2$ and $NO_x$ from the spray dryer to a fabric filter and collecting any solids therein and absorbing a portion of the $SO_2$ remaining in the gas stream and a portion of the $NO_x$ remaining in the gas stream with ZnO;
   e. controlling the ZnO content of the aqueous slurry so that sufficient unreacted ZnO is present in the solids collected in the fabric filter to react with $SO_2$ and $NO_x$ as the gas passes through the fabric filter whereby the overall feed ratio of ZnO to $SO_2$ plus $NO_x$ is about 1.0 to 4.0 moles of ZnO per mole of $SO_2$ and about 0.5 to 2.0 moles of ZnO per mole of $NO_x$; and
   f. regenerating the ZnO having absorbed $SO_2$ and $NO_x$.

4. The process of claim 3 whereby the regeneration of ZnO having absorbed $SO_2$ and $NO_x$ further comprises:
   a. collecting the reacted ZnO having absorbed $SO_2$ and $NO_x$ from the fabric filter;
   b. calcining the reacted ZnO from step a to decompose the reacted ZnO to ZnO, $SO_2$, NO, and $NO_2$;
   c. cooling, classifying and grinding the ZnO obtained from step b; and
   d. mixing the ZnO from step c with water to produce an aqueous ZnO slurry suitable for use in the spray dryer.

5. The process of claim 4 further comprising: feeding the $SO_2$, NO, and $NO_2$ to an acid plant for conversion to sulphuric and nitric acid.

6. The process of claim 3 further comprising: injecting saturated steam into the gas stream prior to flowing the gas stream to the spray dryer.

7. The process of claim 3 further comprising: extracting heat from the gas stream prior to flowing the gas stream to the spray dryer.

8. The process of claim 3 further comprising: operating the spray dryer at a 0° F. approach to saturation and reheating the flowing gas stream prior to the fabric filter.

9. The process of claim 3 further comprising: injecting steam into the gas stream prior to flowing the gas stream to the fabric filter.

10. The process of claim 3 further comprising adding silica gel to the aqueous ZnO slurry within a weight ratio range of silica gel to ZnO of about 1:10 to 1:1.

11. The process of claim 3 further comprising oxidizing NO to $NO_2$ in an oxidation chamber.

12. The process of claim 3 further comprising controlling $SO_2$ removal in the spray dryer so that the $SO_2$ can have a synergistic effect no $NO_x$ removal in the fabric filter.

13. The process of claim 4 further comprising adding one-half mole carbon per mole of zinc sulfate after step a and prior to calcining to lower the decomposition temperature of zinc sulfate and operating the calciner at the lower temperature.

14. The process of claim 4 further comprising extracting the zinc sulfate with water after step a and prior to the calcination step and performing the calcination step (b) at a temperature between about 450° to 550° F.

15. The process of claim 4 further comprising performing the calcination step (b) at a temperature between about 450° to 55° F. whereby the zinc sulfate is allowed to reach a steady state concentration in the recycled solids.

16. The process of claim 4 further comprising operation step (b) at a calcination temperature of 1400° F.

* * * * *